July 4, 1961     I. E. JACKSON     2,990,734
TOOL TO PREPARE RIVETS FOR HEADING
Filed Dec. 21, 1959
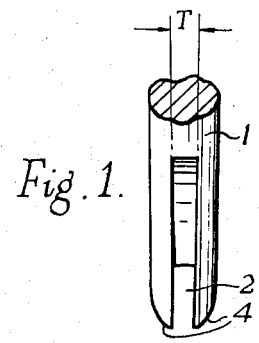
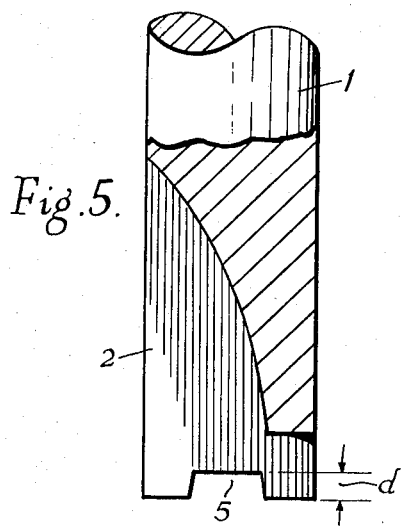
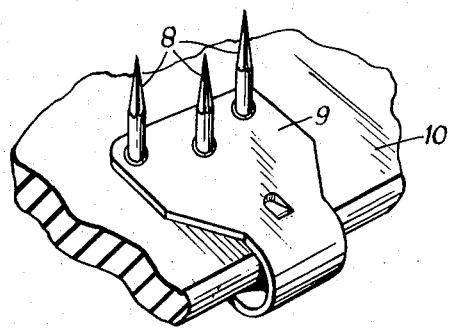
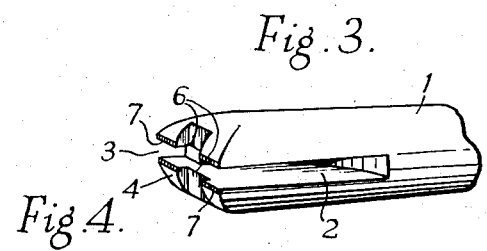
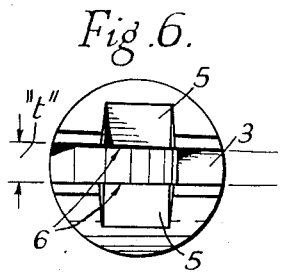
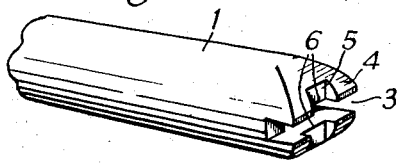
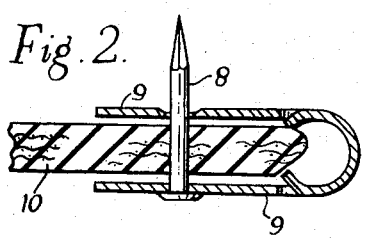
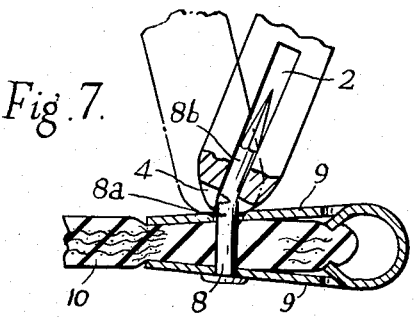
INVENTOR
ISAAC E. JACKSON

United States Patent Office 2,990,734
Patented July 4, 1961

2,990,734
TOOL TO PREPARE RIVETS FOR HEADING
Isaac Edward Jackson, Glossop, England, assignor to Henri Eugene Leflon, Tangier, Morocco
Filed Dec. 21, 1959, Ser. No. 861,110
2 Claims. (Cl. 81—3)

The present invention is concerned with a hand tool which is primarily (but not exclusively) intended for use when fixing belt fastenings to conveyor belts or the like by rivets, the fastenings being of the kind which comprise U-shaped metal plates which embrace and are fixed to the belt ends by means of rivets which extend through aligned holes in the parallel limbs of the U-shaped plates and the portion of the belt sandwiched between them, the closed or looped ends of the fastenings on opposed or joined together ends of the belt interengaging and combining to receive a hinge pin.

The present method of riveting fastenings of the kind referred to, to belt ends, consists in driving the rivets through the aligned holes in the limbs of the fastenings and the portions of the belt which are sandwiched between said limbs until the unheaded and pointed ends of the rivets extend from one side of the fastenings. It is then usual to engage a tube over the projecting unheaded or pointed portion of each rivet so that the end of the tube engages one face of the fastening and then to subject the tube to hammer blows to force the limbs of the fastening tightly against opposite faces of the belt. When this has been done a separate and distinct operation consists in cropping or snipping off the excess length of the rivet leaving sufficient which can be subsequently deformed into a head against the fastener.

This known procedure has the disadvantage that two separate operations are involved i.e. firstly the pressing of the limbs of the fastener against opposite sides of the belt, and secondly, the snipping or cropping of the rivet to length. These separate operations result in the loss of an enormous amount of time over a period of, say, a year when re-splicing large numbers of belts in mines, steelworks, quarries, factories and like places where large numbers of belts are in use.

A further disadvantage of this known procedure is that poor riveting often results due to the fact that the rivets are frequently cut off at an incorrect length i.e. either too short or too long. In the first case, the rivets are ineffective and in the second case they tend to bend over rather than flatten out and form a head.

The object of the invention is to provide a tool which is adapted to carry out by a single operation the two hitherto separate operations referred to above and which ensures that a projecting part of the rivet always remains of a size which will enable this end of the rivet to be properly headed.

Although the invention is particularly applicable to riveting of fasteners to belts, it is to be appreciated that the tool may be used for similar riveting operations where it is desired that an excess length of rivet should be broken away leaving a projecting part of the rivet of a predetermined size which can be formed into a head.

According to the present invention there is provided a hand tool for the purpose set forth which comprises a shank formed at its lower or work-engaging end with a transverse slot adapted to engage over an unheaded end of a rivet projecting beyond one face of a workpiece said slot having cutting edges which cut into and partly sever and so weaken the rivet when the tool is subjected to hammer blows to urge its lower end against a workpiece, the cutting edges of said slot being spaced inwardly of the work engaging end of the tool so that an excess length of the rivet can be broken away where it is weakened by rocking the tool so as to leave a portion of the rivet of a predetermined length projecting above the face of the workpiece which can be deformed into a head.

Preferably, the lower end of the tool is formed at one side with a longitudinal or axial slot which intersects the transverse slot between said cutting edges and into which the excess length of rivet can pass as the tool is hammered along the rivet and from which the broken away part of the rivet can subsequently escape.

To enable the invention to be clearly understood an embodiment thereof will now be described by way of example as applied to the weakening and snipping of rivets securing a belt fastening to a belt end.

In the drawings,

FIGURE 1 is a perspective view showing the tool positioned above rivets which are to have their projecting ends snipped or cropped, the upper end of the tool being broken away.

FIGURE 2 is a cross section through a belt end and a fastener prior to riveting.

FIGURE 3 is a perspective view from one side of the working end of the tool.

FIGURE 4 is a perspective view from the other side of the working end of the tool.

FIGURE 5 is a part sectional view drawn to a larger scale, of the lower end of the tool.

FIGURE 6 is an underneath plan view and

FIGURE 7 is a view showing the rivet being cropped and the plates of the fastener urged tightly against the side faces of the belt.

Referring to the drawings, the tool comprises a shank 1 which is formed at its lower end with a longitudinal axial slot 2 into which a broken away excess part of a rivet can pass and escape. The extreme lower end of the tool is formed with a transverse slot 3 to divide this end of the tool into two claw-like parts 4 and the chamferred face of each claw is recessed as at 5 to provide cutting edges 6 which are disposed just above the lower end of the tool which is constituted by ears 7. It will be appreciated that when the tool is lowered over a rivet and then driven along the length of the rivet 8 until the ears 7 contact and urge the limbs 9 of the fastener tightly against a belt end 10 that the cutting edges 6 will be distanced an amount $d$ above the surface of the fastener so that when a rivet has been snipped or cropped as hereinafter more fully explained a portion 8a of the rivet 8 will always remain which is equal to the dimension $d$ (FIGURE 5) so that a rivet can neither be snipped too short nor too long.

In use, the lower end of the tool is engaged over the rivet and the tool is struck with a hammer to force it along the rivet and the cutting edges 6 shave off opposite sides of the rivet and so weaken it. When the ears 7 contact the plates 9 of the fastening, hammering is continued to urge the plates 9 from their positions in FIGURE 2, in which they are a loose fit on the belt 10, to the position shown in FIGURE 7 in which they grip the belt tightly. The rivet is then ready to be cropped and this is achieved by rocking the tool to and fro as shown in FIGURE 7 until the unwanted part of the rivet is snapped off leaving a projecting portion 8a of a predetermined size which is neither too long nor too short and permits a perfect rivet head to be formed by a subsequent operation. To facilitate rocking of the tool, its lower end comprising the ears 7 of the claw-like parts 4 is chamfered as shown.

The broken away part 8b (FIGURE 7) of the rivet passes into the longitudinal groove 2 from which it is free to escape, the groove tapering both longitudinally as indicated at T (FIGURE 1) and laterally as indicated at $t$ (FIGURE 6) so that the inner end of the groove is larger than its outer end to permit the broken away part of the rivet to escape easily without jamming.

What I claim is:

1. A tool for cutting to length a rivet end projecting from a workpiece, said tool comprising a shank having a workpiece engaging end provided therein with two parallel claw-like portions defining a transverse slot engageable over said rivet end, parallel workpiece engaging outer edges on said claw-like portions, opposed chamfered side faces extending from said outer edges, cutting edges spaced inwardly in said transverse slot and parallel therewith, said cutting edges adapted to cut into and partially sever the rivet end under the action of blows applied to the tool to urge its workpiece engaging end against the workpiece, the side surface of the workpiece engaging end of the shank being provided with an axial slot intersecting the said transverse slot between the said cutting edges and into which axial slot the excess length of the rivet end can pass as the tool is forced thereover and from which the severed portion of the rivet can escape.

2. A tool according to claim 1, wherein the said axial slot tapers both longitudinally and transversely so that it is largest at its inner end to facilitate the escape of the severed portion of the rivet.

References Cited in the file of this patent

UNITED STATES PATENTS

| | | |
|---|---|---|
| 1,503,323 | Heasley | July 29, 1924 |
| 2,210,061 | Caminez | Aug. 6, 1940 |
| 2,719,358 | Lassen | Oct. 4, 1955 |
| 2,807,810 | Belek et al. | Oct. 1, 1957 |